(12) United States Patent
Kim (10) Patent No.: US 9,346,136 B2
(45) Date of Patent: May 24, 2016

(54) METHOD FOR MANUFACTURING MODEL

(76) Inventor: Taehoon Kim, Whangarei (NZ)

( * ) Notice: Subject to any disclaimer, the term of this patent is extended or adjusted under 35 U.S.C. 154(b) by 190 days.

(21) Appl. No.: 14/118,921

(22) PCT Filed: Jun. 13, 2011

(86) PCT No.: PCT/KR2011/004318
§ 371 (c)(1),
(2), (4) Date: Nov. 20, 2013

(87) PCT Pub. No.: WO2012/169683
PCT Pub. Date: Dec. 13, 2012

(65) Prior Publication Data
US 2014/0082917 A1 Mar. 27, 2014

(30) Foreign Application Priority Data
Jun. 8, 2011 (KR) .................. 10-2011-0054930

(51) Int. Cl.
| | | |
|---|---|---|
| *B23P 19/04* | (2006.01) | |
| *G09B 19/10* | (2006.01) | |
| *A63H 9/00* | (2006.01) | |
| *A63H 33/42* | (2006.01) | |
| *A63F 9/12* | (2006.01) | |
| *B44C 3/12* | (2006.01) | |
| *B44C 3/02* | (2006.01) | |

(52) U.S. Cl.
CPC ............... *B23P 19/04* (2013.01); *A63F 9/1288* (2013.01); *A63H 9/00* (2013.01); *A63H 33/42* (2013.01); *G09B 19/10* (2013.01); *A63F 2009/1292* (2013.01); *A63F 2009/1296* (2013.01); *B44C 3/025* (2013.01); *B44C 3/12* (2013.01); *Y10T 29/49789* (2015.01); *Y10T 29/49798* (2015.01); *Y10T 29/49826* (2015.01); *Y10T 29/49885* (2015.01)

(58) Field of Classification Search
CPC .......... B23P 19/04; A63H 33/42; A63H 9/00; A63F 9/1288; A63F 2009/1296; A63F 2009/1292; G09B 19/10; Y10T 29/49885; Y10T 29/49789; Y10T 29/49798; Y10T 29/49826
See application file for complete search history.

(56) References Cited

U.S. PATENT DOCUMENTS

| | | | | |
|---|---|---|---|---|
| 4,464,214 A | * | 8/1984 | Tsuchie .................. | A63H 9/00 144/346 |
| D437,644 S | * | 2/2001 | Russo .......................... | D25/138 |
| 2011/0174126 A1 | * | 7/2011 | Rauch ................. | G02F 1/13338 83/23 |

FOREIGN PATENT DOCUMENTS

| | | |
|---|---|---|
| JP | 2000-300407 | 10/2000 |
| KR | 20-0251927 | 11/2001 |
| KR | 10-0710498 | 4/2007 |
| KR | 10-2010-0021722 | 2/2010 |

* cited by examiner

*Primary Examiner* — John C Hong
(74) *Attorney, Agent, or Firm* — Lex IP Meister, PLLC (57) ABSTRACT

A method for manufacturing a model is disclosed. The disclosed method for manufacturing the model comprises the steps of: a) preparing a plurality of pieces having contours in the shape of cross-sections of an object from specific distances away from a random axis direction; and b) assembling the plurality of pieces according to an integration process of connecting surfaces of adjacent pieces from the plurality of pieces and fixing same to each other so as to form the model which corresponds to the shape of the object.

1 Claim, 10 Drawing Sheets

METHOD FOR MANUFACTURING MODEL

TECHNICAL FIELD

The present invention relates to a method for manufacturing a model. More particularly, the present invention relates to a method for manufacturing a model which may extract a plurality of contours with respect to a shape of an object through three-dimensional computer modeling, print the plurality of contours on a plate, and manufacture a dedicate model similar to a real shape by an integration process overlapping the plate cut along the contours.

BACKGROUND OF ART

In general, various materials may be used for a method of manufacturing a model of an object. Among them, a method of manufacturing a model using a paper uses a scheme of tightly fitting a plurality of pieces in grooves, respectively.

However, since the method of manufacturing a model using the paper cannot delicately manufacture a three-dimensional model of an object, there is a limitation to create a real shape of an object.

Further, durability is significantly degraded so that a model is damaged due to weak external force. Accordingly, the model cannot serve as a model so that the user cannot recognize an original shape.

DISCLOSURE

Technical Problem

The present invention has been made in an effort to provide a method of manufacturing a model having advantages of easily manufacturing a model which has high durability and is delicately similar to a real shape of an object and of reducing a manufacturing cost.

Technical Solution

According to an embodiment of the present invention, a method for manufacturing a model is provided, the method including: a) preparing a plurality of pieces having contours in the shape of cross-sections of an object at specific positions disposed along a random axis of the object with a predetermined interval; and b) assembling the plurality of pieces through an integration process of connecting and fixing surfaces of adjacent pieces among the plurality of pieces to each other so as to form the model which corresponds to the shape of the object.

Step a) may include: a1) making a three-dimensional model with respect to the object through three-dimensional computer modeling; a2) extracting an outline by introducing a virtual plane in the three-dimensional model, and converting the extracted outline into a spline to store the spline; a3) extracting a next outline at a next position in the axis, and converting the extracted next outline into a next spline to store the next spline; a4) repeating step a3) along the axis; a5) printing the plurality of splines formed by steps a2) to a4) on prepared plates; and a6) making the plurality of pieces by cutting along the splines printed on the plates.

In step a5), a pair of splines among the plurality of splines may be printed on the plate, an outer spline of the pair of splines serves as a cutting line, and an inner spline of the pair of splines serves as a guideline, and in step a6), the plate is cut along the cutting line to make the plurality of pieces.

Step b) may include disposing and fixing a remaining piece suited to the guideline printed on one of adjacent pieces.

The plate may be made of one of a corrugated paper, an Styrofoam, and a wood, and Step b) may include pasting and fixing surfaces of pieces facing each other by an adhesive.

Advantageous Effects

According to the present invention, the durability can be improved as compared with the related art so that a life of the model may be extended.

Further, the present invention can manufacture a model having a delicate shape more similar to a real shape of an object than a model manufactured in a manufacturing scheme according to the related art. Accordingly, the model of the present invention can enhance arousing interesting as a model for games of children, and can improve learning efficiency as a model for education (learning).

Further, since the present invention may exactly determine a disposal position of two adjacent pieces through the guideline in a state that the guideline is formed at one of the two adjacent pieces, a model can be easily manufactured without errors of manufacture so that the model can be delicately manufactured.

The present invention can manufacture a three-dimensional model of a high cost and a high added value with using a paper which is a two-dimensional material of a low cost, and can manufacture the three-dimensional model with using a corrugated paper, thereby a material cost being reduced. In addition, since the material cost can be significantly reduced when a waste corrugated paper is used, the whole manufacturing cost can be reduced.

MODE FOR INVENTION

Objects, characteristics, and advantages of the present invention may be easily understood through following exemplary embodiments with reference to the accompanying drawings. However, the present invention may be modified in various different ways, not limited to the exemplary embodiments described herein.

Hereinafter, the present invention will be described in detail with reference to the accompanying drawings. In order to describe following specific exemplary embodiments, various characteristic contents are made for the purpose of describing and understanding the present invention. However, when the present invention is described, parts known in the art but is not related to the present invention are not described in order to avoid confusion without specific reasons.

Hereinafter, a method of manufacturing a model according to an exemplary embodiment of the present invention will be described.

Figure 1:
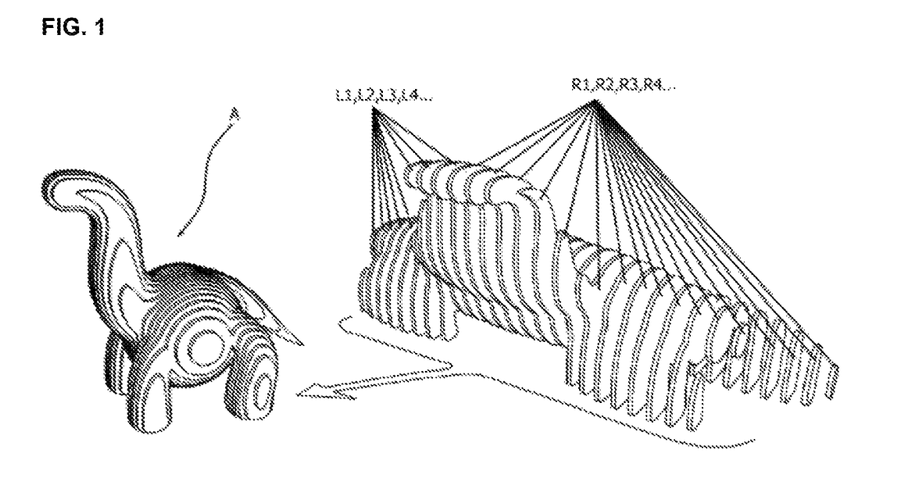
FIG. 1 is a schematic view illustrating a method of manufacturing a model according to an exemplary embodiment of the present invention.

In the present invention, as shown in FIG. 1, a plurality of pieces (R1, R2, R3, R4 ..., L1, L2, L3, L4 ...) composed of a corrugated paper having contours in the shape of cross-sections of an object at specific positions disposed along a random axis of the object with a predetermined interval are prepared, and a model corresponding to a shape of the object is manufactured through an integration process of connecting surfaces of adjacent pieces among the plurality of pieces and fixing the same to each other. That is, the present invention completes a model through an integration process by stacking and coupling a plurality of pieces having contours in the shape of cross-section of the object as described above. In this case, it is preferable that the pieces are coupled with each other by an adhesive.

Figure 2:
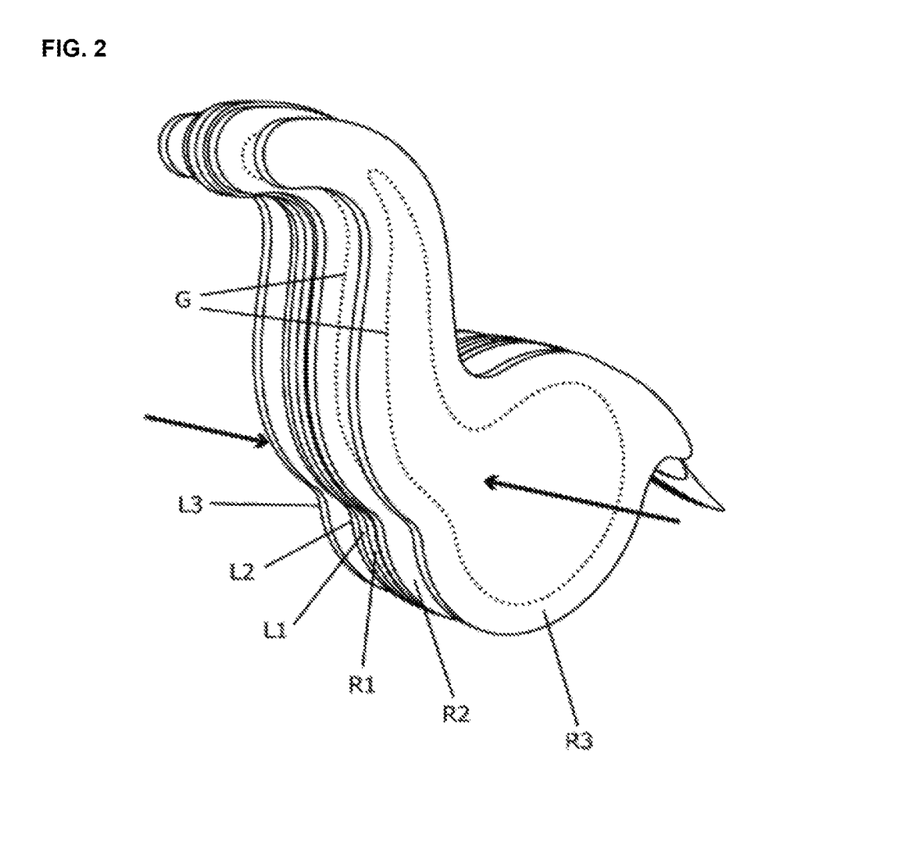
FIG. 2 is a view illustrating a piece in which a guide line is drawn in a method of manufacturing a model according to an exemplary embodiment of the present invention.

In the present invention, as shown in FIG. 2, a guide line G is formed at one of a pair of surfaces facing each other of pieces R2 and R3 adjacent to each other. Since two pieces R2 and R3 may be coupled with each other in a state that a remaining piece R3 is disposed suited to a guideline G formed at one piece R2, pieces may be easily coupled at an exact position.

Figure 3:
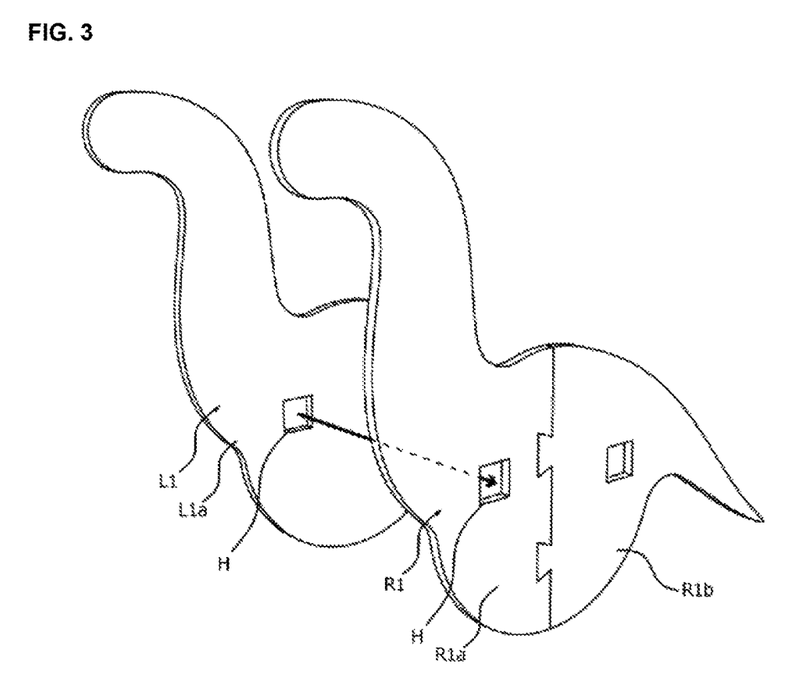
FIG. 3 is a view illustrating a state that a hole is formed in the same location of a pair of pieces having the same size in the method of manufacturing a model according to an exemplary embodiment of the present invention.

Meanwhile, as shown in FIG. 3, when the adjacent pieces L1 and R1 have the same size during an assembling procedure, in order to find a coupling disposal position, a hole H may be formed at the same position of the respective pieces L1 and R1 and may be used as a reference point. Further, in the present invention, as show in FIG. 3, one piece R1 may include a first part R1a and a second part R1b to be separated from each other. The first part R1a and the second R1b may be separated from and coupled with each other by a coupling structure in which grooves and protrusions are formed, respectively.

In the present invention, when a piece is manufactured by a corrugated paper which is a light plate and has a predetermined thickness, since the corrugated paper has a greater thickness than other sort of papers, the number of pieces necessary for manufacturing the model may be reduced. Further, the corrugated paper is cheaper than other papers and when a waste corrugated paper is used, a material cost may be considerably reduced.

In the present invention, in order to prepare the piece for manufacturing the model, contours of the three-dimensional model are extracted at specific positions disposed along a random axis, with a predetermined interval, of a three-dimensional model corresponding to an object through three-dimensional modeling. After the extracted contours are printed on the corrugated paper, the corrugated paper is cut along the contours.

Figure 14:
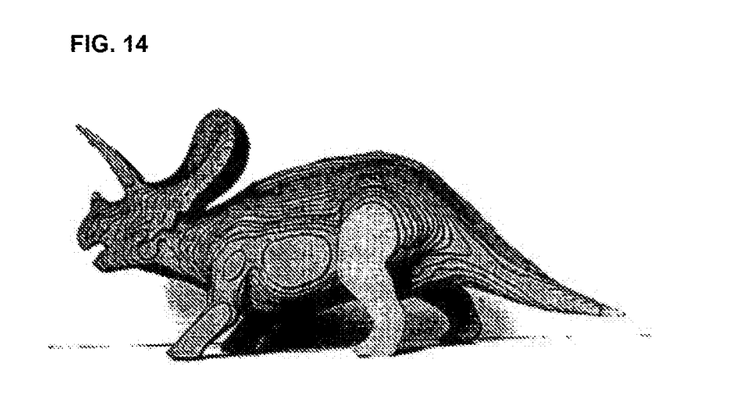

In detail, a step of preparing a piece will be described with reference to FIGS. 4 and 14.

Figure 4:
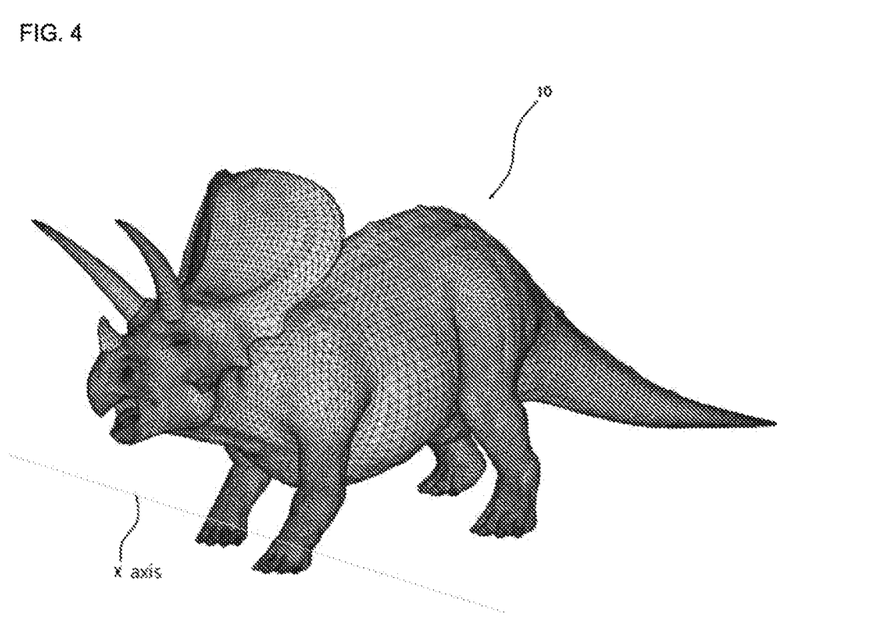
FIGS. 4 to 11 are views illustrating a step of extracting an outline of a three-dimensional model of an object through three-dimensional computer modeling in the method of manufacturing a model according to an exemplary embodiment of the present invention.
Figure 5:
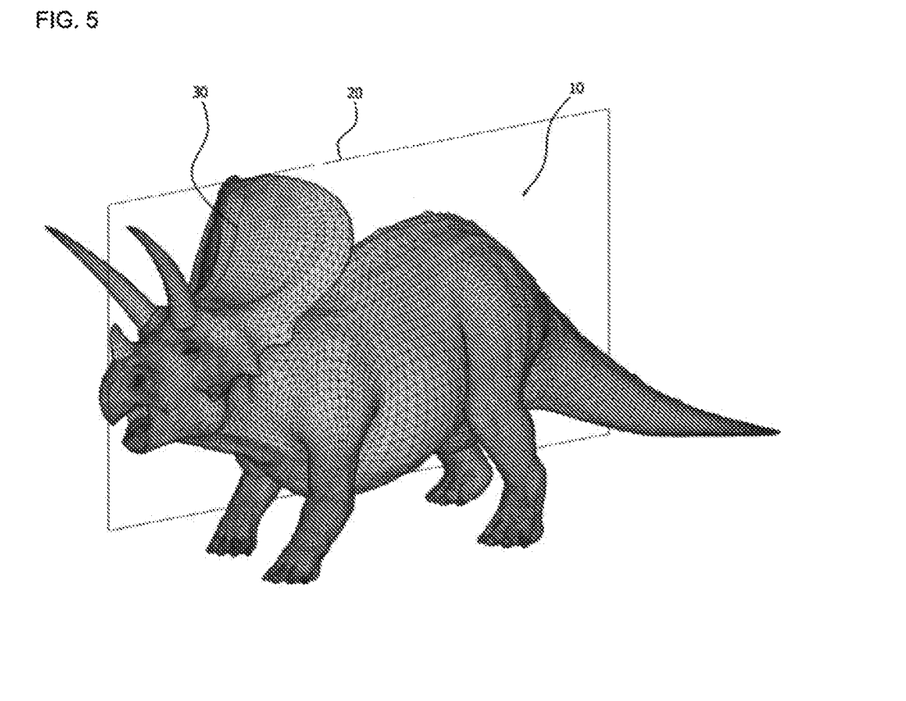
Figure 6:
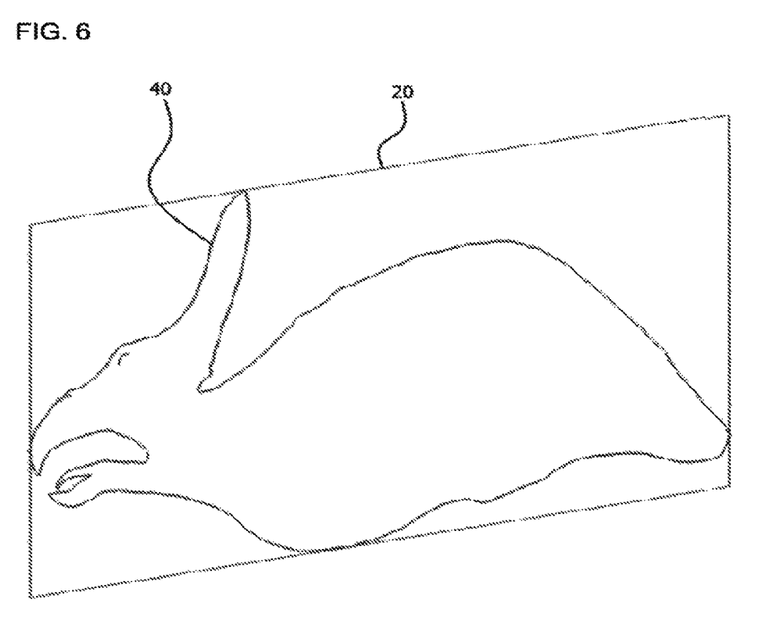

As shown in FIG. 4, a three-dimensional model 10 with respect to an object is made through three-dimensional computer modeling. As shown in FIG. 5, a virtual plane 20 of the three-dimensional model 10 is introduced to extract an outline 30, and the virtual plane 20 is converted into a spline 40 and the spline 40 is stored as shown in FIG. 6.

Figure 7:
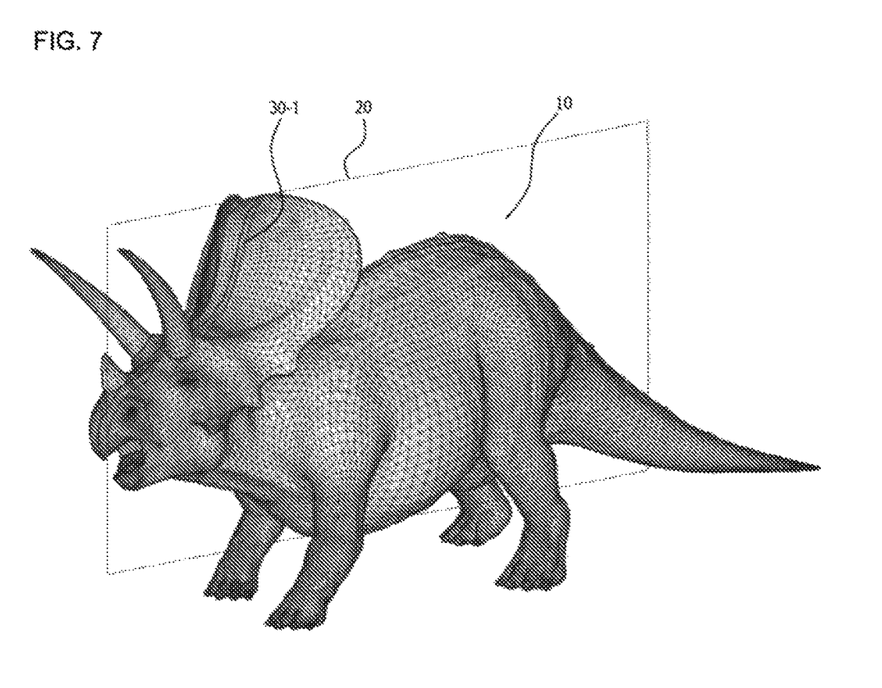
Figure 8:
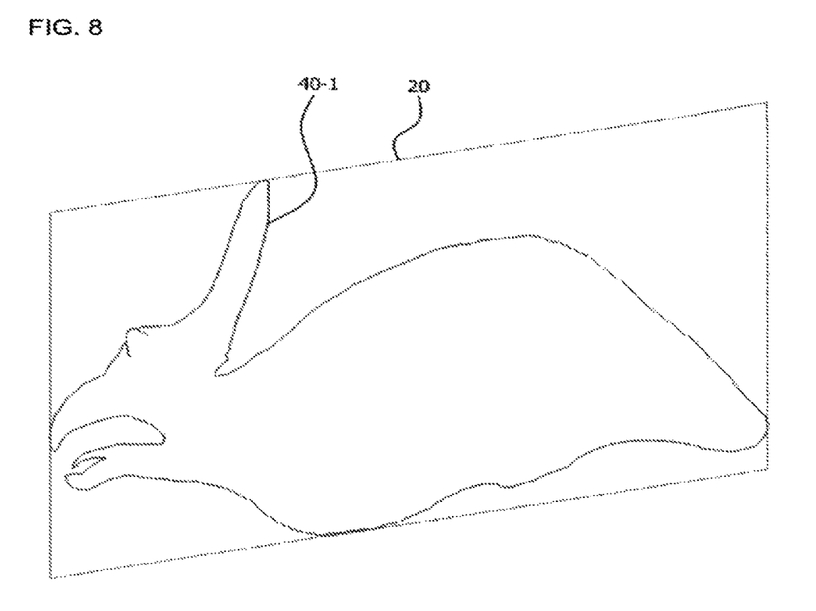

Next, as shown in FIGS. 7 and 8, a next outline 30-1 is extracted at a next position moved a predetermined interval along an axis, and the extracted next outline 30-1 is converted into a spline 40-1 and the spline 40-1 is stored.

Figure 9:
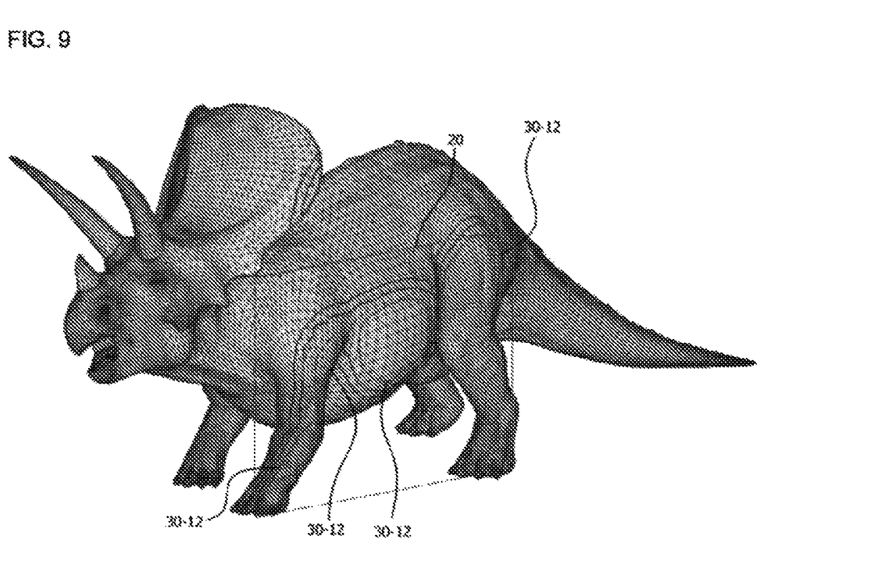
Figure 10:
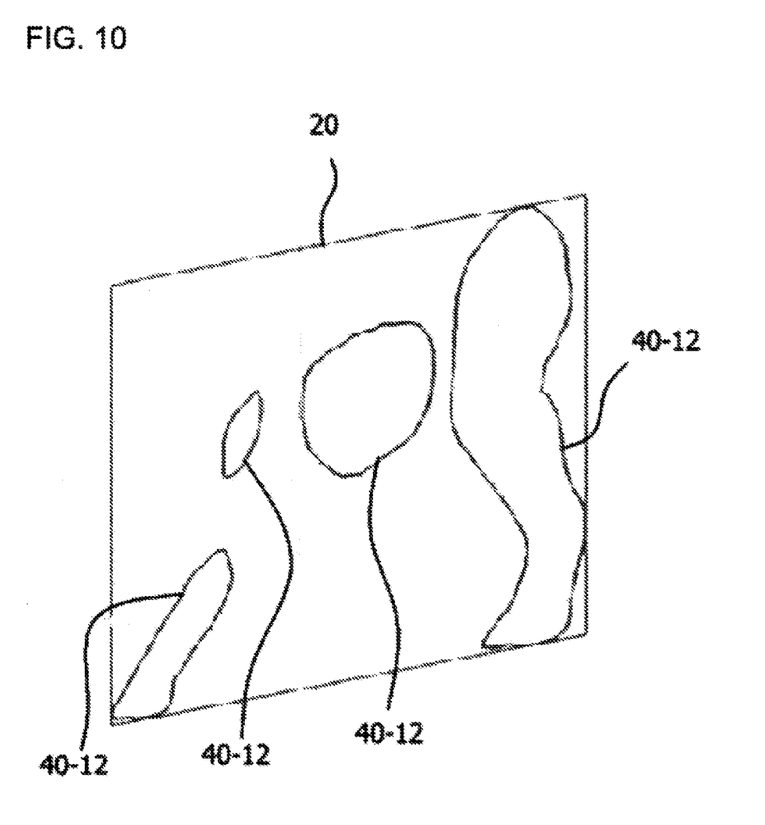

Next, a procedure of extracting an outline at a position moved outward for the predetermined interval along the axis, and converting the extracted outline into a spline to store the spline is repeated. As a result, as shown in FIG. 9, an outermost outline 30-12 in the axis is extracted, and the outermost outline 30-12 is converted into a spline 40-12 and the spline 40-12 is stored.

Figure 11:
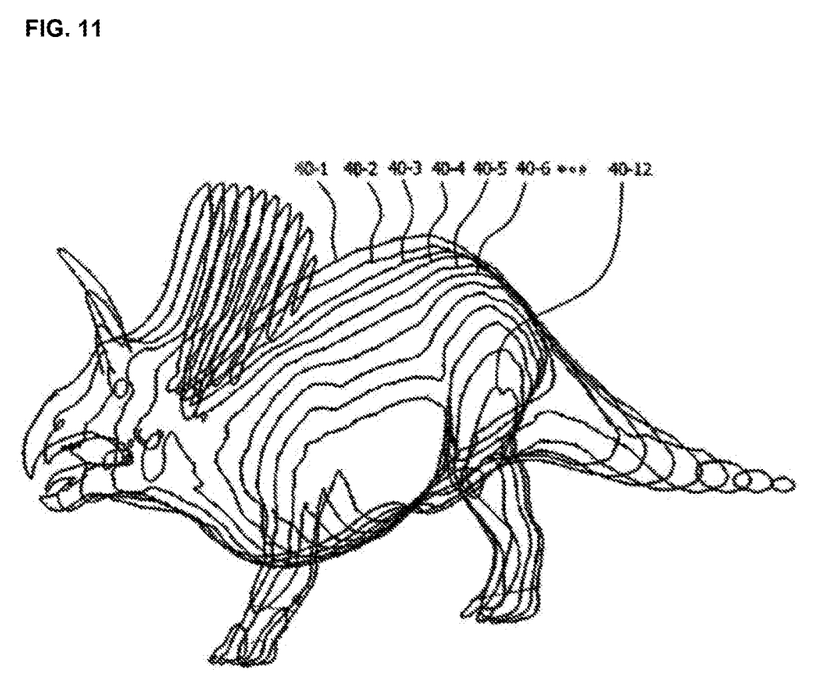

Next, as shown in FIG. 11, splines 40-1 to 40-12 extracted by the foregoing scheme are aligned.

Figure 12:
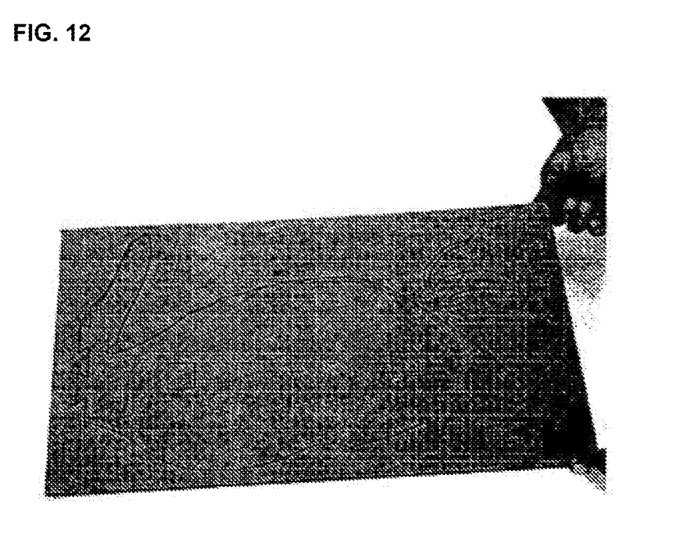
FIGS. 12 to 16 are photographs related to real manufacture in the method of manufacturing a model according to an exemplary embodiment of the present invention.

Next, a pair of adjacent splines among a plurality of splines 30-1 to 30-12 which are aligned are printed on one corrugated paper. In more detail, although not shown, a pair of adjacent splines are printed on each corrugated paper in such a way that a first spline and a second spline are printed on a first corrugated paper, the second spline and a third spline are printed on a second corrugated paper. In this case, in the pair of splines printed on one corrugated paper, a spline printed on an outer side serves as a cutting line and a spline printed on an inner side serves as a guideline. FIG. 12 is a photograph illustrating a state that a cutting line and a guideline are actually printed on a corrugated paper.

After that, respective pieces {corresponding to respective pieces R1,R2,R3,R4 ... L1,L2,L3,L4 ... shown in FIG. 1} may be prepared by cutting a corrugated paper on which the spline is printed.

A model using a corrugated paper may be manufactured by stacking and adhering pieces manufactured by the step of preparing pieces using an adhesive (integration process). At this time, the pieces may adhere to an exact position by disposing a remaining piece suited to a guideline formed on one of adjacent pieces and adhering the pieces by an adhesive. Further, at first, when adhering adjacent pieces having the same size, the adjacent pieces are arranged by matching holes formed at the pieces with each other.

Figure 13:
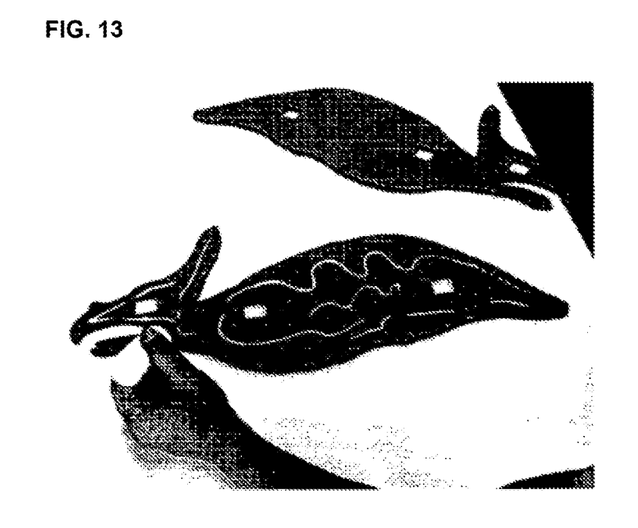
Figure 15:
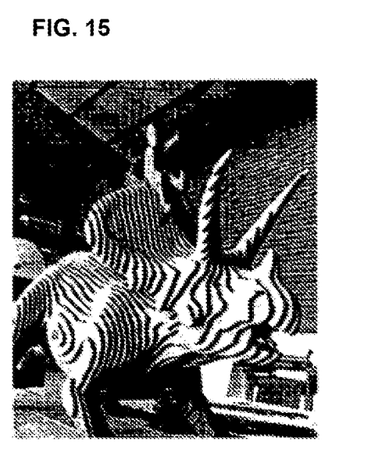
Figure 16:
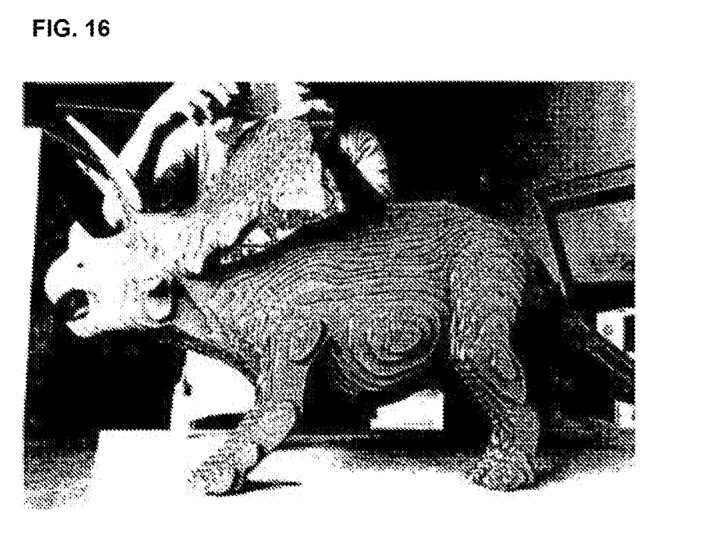

FIG. 13 is a photograph illustrating a state that an adhesive is pasted to adjacent pieces having substantially the same size. FIGS. 14 to 16 are real photographs of models manufactured by a method of manufacturing a model according to the present invention.

Meanwhile, in the above exemplary embodiment of the present invention the corrugated paper is used as a plate to manufacture a piece. However, the present invention is not limited thereto. That is, a Styrofoam or a wood having a light weight may be used as a plate to manufacture a piece.

INDUSTRIAL APPLICABILITY

The present invention may be used in an industry to manufacture and supply a model of an animal, a building, or an object.

The invention claimed is:

1. A method for manufacturing a model, the method comprising:
   a) preparing a plurality of pieces having contours in a shape of cross-sections of an object at specific positions disposed along a random axis of the object with a predetermined interval; and
   b) assembling the plurality of pieces through an integration process of connecting and fixing surfaces of adjacent pieces among the plurality of pieces to each other so as to form the model which corresponds to a shape of the object;
   wherein step a) comprises:
   a1) making a three-dimensional model with respect to the object through three-dimensional computer modeling;

a2) extracting an outline by introducing a virtual plane in the three-dimensional model, and converting the extracted outline into a spline to store the spline;

a3) extracting a next outline at a next position in the axis, and converting the extracted next outline into a next spline to store the next spline;

a4) repeating step a3) along the axis;

a5) printing the plurality of splines formed by steps a2) to a4) on prepared plates; and a6) making the plurality of pieces by cutting along the splines printed on the plates;

wherein:

in step a5), a pair of splines among the plurality of splines are printed on the plate, an outer spline of the pair of splines serves as a cutting line, and an inner spline of the pair of splines serves as a guideline, and in step a6), the plate is cut along the cutting line to make the plurality of pieces.

\* \* \* \* \*